United States Patent
Tuningley

(10) Patent No.: US 8,782,874 B2
(45) Date of Patent: Jul. 22, 2014

(54) RAILWAY TIE AUTOMATED PREPLATING APPARATUS

(75) Inventor: Allen J. Tuningley, Richmond (CA)

(73) Assignee: voestalpine Nortrack Inc., Vancouver, BC (CA)

(*) Notice: Subject to any disclaimer, the term of this patent is extended or adjusted under 35 U.S.C. 154(b) by 2157 days.

(21) Appl. No.: 11/536,579

(22) Filed: Sep. 28, 2006

(65) Prior Publication Data
US 2008/0141515 A1    Jun. 19, 2008

(51) Int. Cl.
*B23P 11/00* (2006.01)
*B23P 17/00* (2006.01)

(52) U.S. Cl.
USPC ......... 29/525.01; 29/407.09; 29/430; 104/16; 104/17.1; 144/4.4

(58) Field of Classification Search
USPC ......... 29/407.09, 429, 430, 432, 464, 525.01, 29/798; 73/598; 104/6, 9, 16, 17.1, 17.2; 144/4.4, 133.2; 238/29, 109
See application file for complete search history.

(56) References Cited

U.S. PATENT DOCUMENTS

| | | |
|---|---|---|
| 2,730,320 A | 1/1956 | Wright et al. |
| 3,701,320 A | 10/1972 | Fearon et al. |
| 3,745,930 A * | 7/1973 | Dieringer ................... 104/17.1 |
| 4,178,671 A | 12/1979 | Luttig |
| 4,203,193 A | 5/1980 | Arthur |
| 4,649,971 A | 3/1987 | Hannaford et al. |
| 5,038,914 A | 8/1991 | Cotic et al. |
| 5,275,051 A * | 1/1994 | De Beer ...................... 73/598 |
| 5,343,606 A | 9/1994 | Girouard, Sr. et al. |
| 5,398,616 A | 3/1995 | Eidemanis et al. |
| 5,487,341 A | 1/1996 | Newman et al. |
| 5,528,807 A | 6/1996 | Girouard, Sr. et al. |
| 5,542,355 A | 8/1996 | Madison et al. |
| 5,813,103 A | 9/1998 | Girouard, Sr. et al. |
| 5,961,257 A | 10/1999 | Bettini et al. |
| 6,119,327 A | 9/2000 | Girouard, Sr. et al. |
| 6,131,272 A | 10/2000 | Girouard, Sr. et al. |
| 6,292,997 B1 | 9/2001 | Ollendick et al. |
| 2003/0071133 A1 * | 4/2003 | Girouard et al. ............. 238/109 |
| 2006/0214018 A1 * | 9/2006 | Ollendick ...................... 238/29 |

* cited by examiner

*Primary Examiner* — Donghai D. Nguyen
(74) *Attorney, Agent, or Firm* — Mahamedi Paradice LLP

(57) ABSTRACT

The invention is an apparatus for pre-plating railway ties, including switch ties of varying lengths. An infeed deck and singulator feeds individual ties, each provided with identifying indicia, to a pre-scanner. Using the scanned indicia, a control system accesses stored data to determine a preliminary drill pattern. A scanning and drilling station positions, secures and scans the tie. The scan results are combined with the stored data to produce a corrected optimal drill pattern, which is used to drill the tie. The drilled tie moves to a plate and screw loading station, where the proper plates and fasteners are attached. A fourth station inspects the assembled tie. If it is properly assembled, the screw spikes are tightened and the plated tie moves to an outfeed deck, where it is marked for identification and removed for storage and shipping.

56 Claims, 7 Drawing Sheets

RAILWAY TIE AUTOMATED PREPLATING APPARATUS

TECHNICAL FIELD OF THE INVENTION

This invention relates generally to railway construction, and more particularly to a semi-automated assembly line to install plates on rail ties or switch ties prior to installation of the ties in a railway line or switch.

BACKGROUND OF THE INVENTION

In this specification, the term "rail tie" refers to cross-ties that are used to attach running rails along a railroad line. Rail ties are typically of a standard length for a given railroad. The term "switch ties" refers to ties used in the vicinity of a switch. Switch ties vary in length along the length of a switch. The more general term "railway ties" encompasses both rail ties and switch ties.

In a railway line, including in the vicinity of a switch, each tie typically has a pair of rail or switch plates (as the case may be) secured to its top surface, one plate being attached to each end of the tie by means of fasteners such as spikes or bolts. Other fasteners extend into the ties and plates and overlap the base of the rails to secure the rails to the ties.

The construction of railway lines often involves securing the plates to the ties in the field (see, for example, U.S. Pat. No. 2,730,962, to Wright et al.). Field installation of plates tends to be slow and requires several individual parts be shipped to the construction site, including ties, plates and spikes. In addition, machinery is required to drill holes into the ties to accommodate screws, or to hammer spikes into the heavy ties. There may also be some difficulty in accurately positioning the plates on the ties.

It is known to pre-plate rail ties in order to simplify and expedite the railway line construction process. Given the required gauge for the line, plates can be attached at a predetermined distance from one end of each tie. The line is then laid out by laying the pre-plated ties and spiking the rails in place.

Examples of pre-plating systems for rail ties are provided in a series of patents issued to Girouard Sr. et al. (U.S. Pat. Nos. 5,343,606; 5,528,807; 5,813,103; 6,119,327; and 6,131,272). Girouard Sr. et al. disclose a pre-plating system wherein a mass of rail ties are aligned and individually loaded onto a conveyor. An individual tie is positioned and secured using an upper and lower template. The system automatically dispenses and positions the rail plates for each tie, using plate cutouts in the upper template. Spikes are automatically fed and positioned using a manipulating arm, then driven through the plates into the tie using a piston shaft press. The plated tie is then discharged via a conveyor system and stacked with other plated ties. U.S. Pat. No. 6,131,272 further discloses a drilling station for making pilot holes and a screw station, if it is desired to attach the plates with lag screws, rather than spikes.

The disadvantages of Girouard et al.'s systems lie in their relative complexity and lack of adaptability. Because the plates are pre-loaded in the plate dispensing mechanism, it is impossible to use different types of plates, as might be required for different rail lines or switches, without stopping the assembly line and re-loading the plate dispenser. Further, aligning the ties properly using upper and lower templates with cutouts through which the plates are set does not allow processing of varying tie lengths, such as switch ties, or ties used in various gauges of rail. Finally, the system apparently does not allow for adjustment according to the particular shape or curvature of any given tie.

U.S. Pat. No. 3,701,320, issued to Fearon et al., discloses another pre-plating system for rail ties. Like the Girouard Sr. et al. systems, Fearon et al.'s pre-plating system is complex and is not readily adaptable to changes in the plates or tie length or shape. In addition, it lacks a drilling station, and therefore requires that the ties be pre-drilled.

Other rail tie pre-plating methods and apparatus are disclosed in U.S. Pat. No. 4,178,671 to Luttig and U.S. Pat. No. 6,292,997 to Ollendick et al. These are simple pre-plating systems, which again lack the ability to optimize the tie plating process and are not adaptable to use with switch ties of varying lengths.

It is therefore an object of the present invention to provide an assembly line whereby railway ties may be accurately pre-plated.

It is a further object of the present invention to provide a pre-plating assembly which is easily adaptable to a variety of tie lengths, such as switch ties, and on which plates may be placed to accommodate any desired gauge.

It is further an object of the invention to provide a pre-plating assembly which can identify a particular tie and drill the tie according to stored data about that tie.

It is yet a further object of the invention to provide an assembly which is capable of scanning a tie and adjusting the pre-stored data to optimize the drilling process.

It is further an object of the invention to provide an assembly line which includes computer-aided inspection of the installed tie plates.

These and other objects of the invention will be appreciated by reference to the summary of the invention and to the detailed description of the preferred embodiment that follow. It will be appreciated that all of the foregoing objectives may not be satisfied simultaneously by the preferred embodiment or by each of the claims.

SUMMARY OF THE INVENTION

The invention comprises an assembly line by which plates may be installed accurately on a variety of shapes and sizes of ties.

The assembly line comprises an infeed conveyor deck, a singulating section, a pre-scanning section, a scanning and drilling station, a plate and fastener loading station, an inspection station, a tightening station and an outfeed conveyor deck. Various conveyor, alignment and buffer chain systems may be interspersed between the stations.

The infeed conveyor deck feeds ties having identifying indicia to the singulating section. After singulation, an overhead pre-scanner reads the identifying indicia on the tie. Monitoring software provides stored information about each tie, including the optimum positions to drill holes for the fasteners with which plates will be attached to the tie.

The tie enters the scanning and drilling station, where it is ended and centered, relative to a reference gate and the centerline of the scanning and drilling station. In order to ensure each tie matches the stored information, two sensors mounted on a scanning/drilling carriage scan the tie, measuring sweep and cant information. The monitoring software then adjusts its stored information and provides an updated drilling pattern and position. The carriage passes over the tie again, drilling the holes as directed by the computer. Any ties not meeting pre-selected criteria are rejected.

Once the holes are drilled, the tie passes to the plate and fastener loading station, where an operator installs the plates and fasteners. The ties are then conveyed to an inspection station to ensure that the correct plates have been installed in the correct manner, following which the fasteners are tightened at the tightening station, firmly attaching the plates to the ties. The plated ties are removed from the assembly line and readied for storage or shipping.

In one aspect, the invention comprises a railway pre-plating apparatus for installing plates on railway ties, comprising an infeed conveyor deck; a singulating section for singulating the ties; a pre-scanning section for identifying the ties; a drilling station for drilling one or more holes into the ties; a plate and fastener loading station for placing one or more plates and fasteners on each of the ties; an inspection station to verify the placement of the plates and fasteners on the ties; a tightening station to tighten the fasteners; and an outfeed conveyor deck.

In a further aspect, the pre-scanning section may comprise a pre-scanner to pre-scan one of the ties to identify the tie; and a computer control system to access a database containing information about the tie and to associate the information with the tie. The database may be created in any suitable manner, such as by reading railway track layout drawings, calculating information about each tie in the drawing and sending the information to the computer control system. The information may include tie length and gauge, one or more preliminary locations for installing one or more plates on the tie, one or more preliminary locations for drill holes to install one or more plates on the tie, and/or the specific tie plates which are to be used for each tie. The information may be retrieved by reading identifying indicia for each tie, thereby accomplishing the identification of one tie, such that information may be associated with the tie. The pre-scanning section may further comprise a secondary scanning section in or before the drilling station wherein further information about the tie is obtained, such as tie sweep and tie cant.

This information may then be used by the computer control system to adjust the preliminary locations for drill holes to obtain optimized locations for drill holes. The drilling station then installs drill holes at those optimized locations.

The information may also be sent, if appropriate, to the plate and fastener loading section, which allows an operator at the plate and fastener loading section to receive the list and manually install the one or more tie plates on each tie, using fasteners, such as screw spikes.

The information may also be sent to the inspection station, allowing the inspection station to conduct an inspection. The inspection may comprise identifying the indicia for each of the ties and plates and comparing the list of one or more tie plates to the identifying indicia to ensure the one or more plates are present and/or are correctly positioned. An alert mechanism may be used to signify that the plates are not present or are incorrectly positioned.

In a further aspect, the tightening section may comprise a lagging machine to tighten fasteners installed at the plate and fastener loading section. The lagging machine may be mounted above the tightening section, on a spike bridge. A jib crane may be present to change the lagging machine if necessary.

In yet a further aspect, the outfeed deck may comprise a marking section, where ties are marked to indicate plates have been correctly installed on the ties. The marking may be done with spray paint, for example. The outfeed deck may terminate at a forklift and may comprise a safety feature, such as a photocell beam which prevents the outfeed deck from operating when the beam is uninterrupted, to prevent the outfeed deck from operating if the forklift is absent.

In a further aspect, the apparatus may comprise manual override controls, whereby an operator at the pre-scanning section, the plate and fastener loading section, or the tightening section may control the pre-plating apparatus.

In another aspect, the invention comprises a railway pre-plating apparatus for installing plates on railway ties, comprising: an infeed section for conveying singulated railway ties; a pre-drilling inspection station for identifying each of the ties, the pre-drilling inspection station comprising at least one scanner; a database for associating each of the ties with drilling and plating instructions; and a drilling and plate fastening section for drilling the ties and installing plates and fasteners on the ties in response to the drilling and plating instructions.

In a further aspect, the drilling and plate fastening section may comprise: a drilling station for drilling the ties; a plate and fastener loading station for installing plates and fasteners on the ties; and a tightening station for tightening the fasteners. Alternatively, the drilling and plate fastening section may comprise a drilling station for drilling the ties; a plate loading station for installing plates on the ties; and a fastener installation station for inserting fasteners into the plates and tightening the fasteners.

There may also be an inspection station between the plate and fastener loading station and the tightening station, the inspection station comprising at least one scanner for identifying the plates on the ties and inspecting the position of the plates installed on the ties. Alternatively, the inspection station may identify the plates on the ties and inspect the position of plates installed on the ties by the drilling and plate fastening section. In either case, the inspection station is operative to receive the drilling and plating instructions for each tie from the database and to inspect the ties by reference to the instructions. The instructions may include one or more preliminary locations for drill holes to install the plates and fasteners on the tie. The inspection station may comprise an alert mechanism to activate if the plates are incorrectly positioned. In a further aspect, the inspection station may be located between the plate loading station and the fastener installation station or after the fastener installation station, wherever is most advantageous for the particular facility.

In a further aspect, the apparatus may comprise a secondary scanning section in or before the drilling and plate fastening station wherein further information about the tie is obtained. The further information may include tie sweep and tie cant, and can be used to adjust the drilling and plating instructions to obtain optimized locations for drill holes. The drilling station then drills drill holes at the optimized locations.

In another aspect, the invention may comprise a packing station, wherein ties are collected into a bundle, which may be strapped, banded or otherwise secured.

In another aspect, the invention comprises a method of pre-plating railway ties comprising the steps of: feeding and singulating railway ties; scanning each tie to identify each of the ties; associating each of the ties with drilling and plating instructions; and drilling the ties and installing plates and fasteners on the ties in response to the drilling and plating instructions.

In another aspect, the invention comprises a method for pre-plating railway ties comprising the steps of: infeeding the ties; singulating the ties; pre-scanning the ties to identify the ties and obtain drilling instructions for each tie; drilling the ties according to the drilling instructions; loading plates and fasteners on the ties; inspecting the ties; tightening the fasteners; and outfeeding the ties.

In a further aspect, the method may comprise the further steps of: prior to drilling the ties, re-scanning the ties; adjusting the drilling instructions to obtain optimized drilling instructions; and drilling the ties according to the optimized drilling instructions. The method may also comprise the further steps of collecting a plurality of ties into a bundle; and banding, strapping or otherwise securing the bundle for shipping or storage.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The preferred embodiment of the invention will be described by reference to the drawings in which.

DETAILED DESCRIPTION OF THE PREFERRED EMBODIMENT OF THE INVENTION

Figure 1:
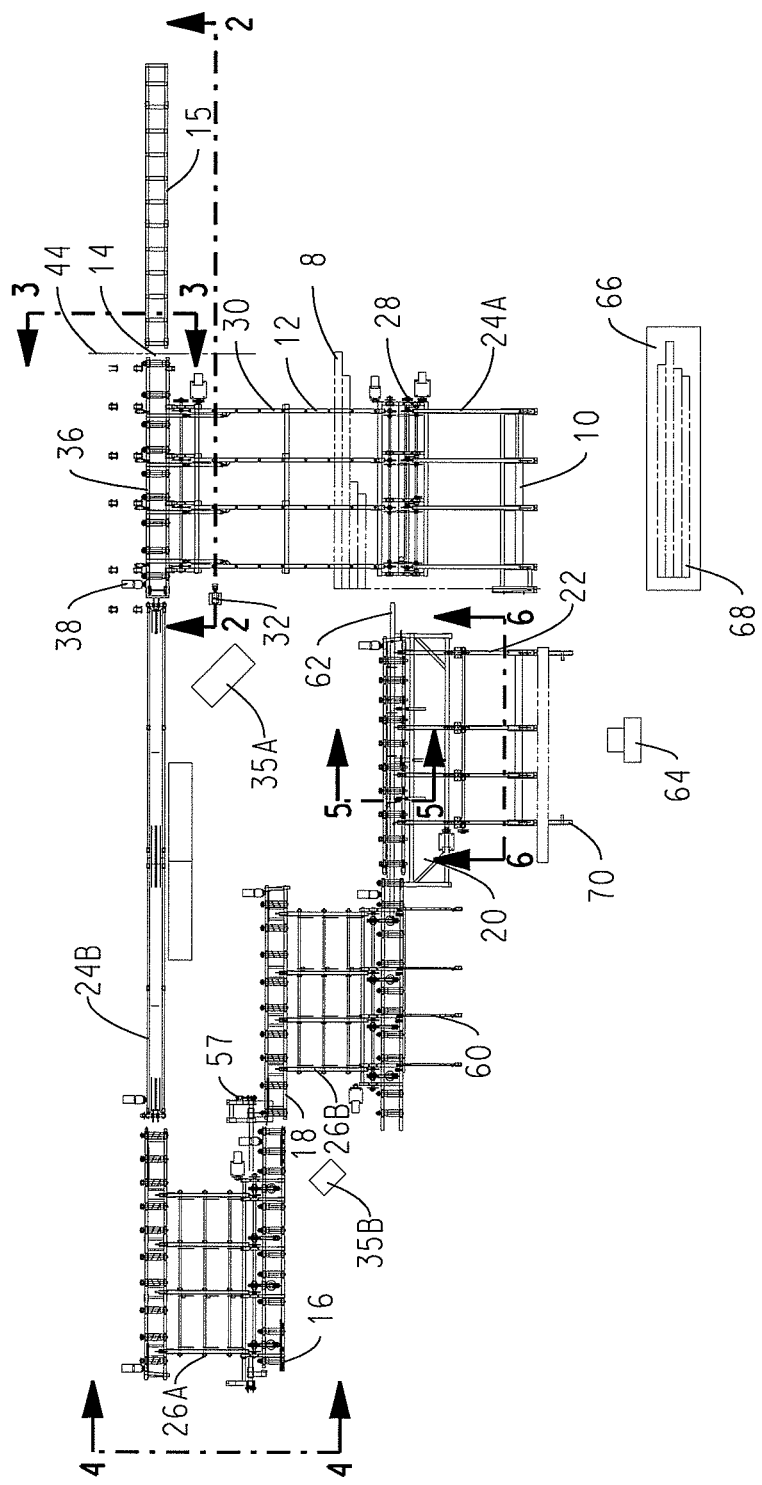
FIG. 1 is a plan view of the overall pre-plating assembly line.

Referring to FIG. 1, the preferred embodiment of the invention includes an infeed conveyor deck 10, a singulating section 12, a scanning and drilling station 14, a plate and fastener loading station 16, an inspection station 18, a tightening station 20 and an outfeed conveyor deck 22. One or more conveyors 24 may separate each station, while buffer zones 26 may also be provided between stations. Positioning gates or similar mechanisms may be located at any station, to ensure that each tie enters the station in the proper position and at the correct orientation.

Ties 8 are loaded onto infeed conveyor deck 10. Preferably, the ties are loaded with their best side up and are placed near to one side of the infeed conveyor deck. The preferred embodiment of the invention is designed to handle all ties ranging from about 8 to 20 feet long and is adapted to process ties with cross sectional dimensions of 10"×10" and 9"×7". The ties 8 may each be pre-marked with identifying indicia 72 (shown in FIG. 7). In the preferred embodiment, the identifying indicia 72 comprises a bar code that is read optically by the pre-scanner 32. In another embodiment, the identifying indicia 72 may comprise the length of the tie 8. For example, if a turnout identification number is entered, the pre-scanner 32 can identify which tie 8 is being processed, as each tie 8 in a particular turnout has a predetermined length. However the identifying indicia 72 could be realized in other ways, such as magnetically, electronically, by manuscript, etc.

Conveyor 24A conveys ties 8 towards a hook stop 28, which squares each tie 8, then towards a singulating device, such as lug chain 30. Lug chain 30 moves faster than infeed conveyor deck 10, thereby creating a gap between the ties 8 and effectively singulating them.

An overhead pre-scanner 32, which may be a scanner such as a traveling verification reader, pre-scans the identifying indicia 72 for each tie. A control system, described in more detail below, uses the identifying indicia 72 to retrieve information about each tie from a data storage system (not shown) via a data connection such as an Ethernet connection. The data storage system is preferably a computer-based monitoring system, such as Rockwell Software's RSView® system, which can store information about the tie, preferably in the form of a list of instructions, which may include, for example, the appropriate plates 74 (shown in FIG. 7) and a location for each preliminary drill hole 78 for each fastener 76 (also shown in FIG. 7) for each tie 8. The system also preferably provides alarm messages and other data displays for troubleshooting and communication between stations and control consoles 35 along the assembly line, as well as with other plant personnel. The list of instructions for each tie is placed in a data buffer for use by the control system during the drilling operation. The list of instructions is also sent to control console 35B at plate and fastener loading station 16, and to a second overhead scanner 57 at inspection station 18. The use of this information is explained in more detail below.

An operator at control console 35A monitors the process of ties 8 through the singulating section 12 and ensures pre-scanner 32 reads and accesses information for each tie 8.

The stored tie, plating and drill information is preferably generated by software that reads drawings created by a draftsman. For example, given a drawing of a turnout, wherein different tie plates and plate spacing will be used for each tie, the software determines the gauge at each point in the turnout, and calculates the proper tie size and plate spacing for each point. The software may also determine the length of each tie. The software uses the information to produce its own data file for each tie in the turnout, including which plate 74 is required, the number of fasteners 76 and preliminary drill holes 78 required, and the position of each preliminary drill hole 78, and stores and associates the data file for each tie with the identifying indicia 72 for the tie.

Figure 2:
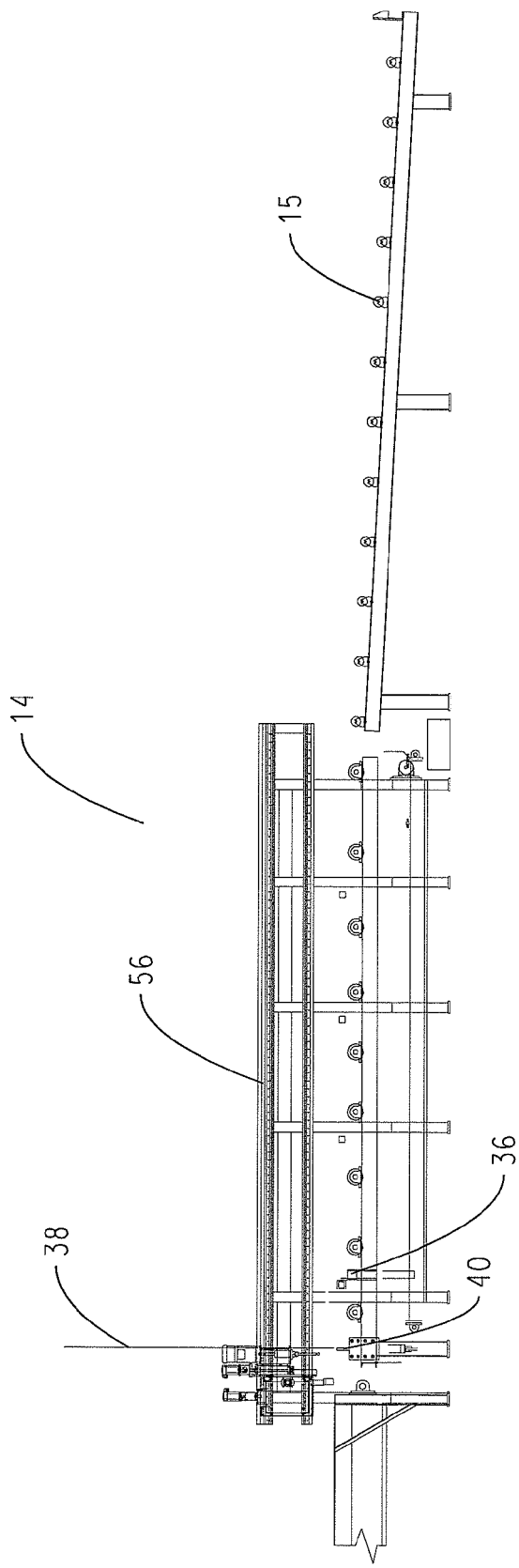
FIG. 2 is an enlarged front view of the scanning and drilling station, taken along line 2-2 of FIG. 1.
Figure 3:
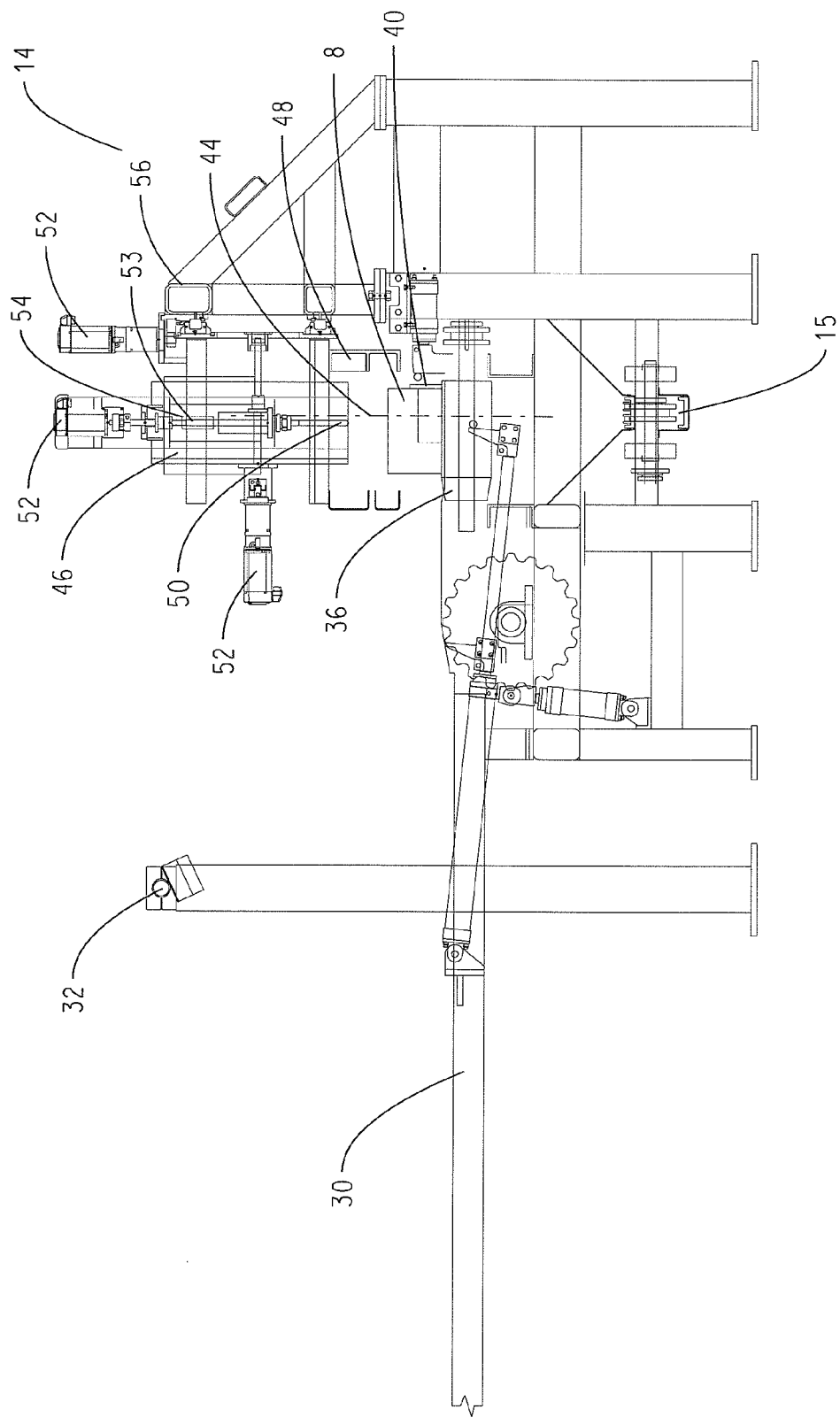
FIG. 3 is an enlarged side view of the scanning/drilling carriage, taken along line 3-3 of FIG. 1.

Tie 8 then proceeds to the scanning and drilling station 14 (shown in more detail in FIGS. 2 and 3). Station 14 includes an even ending system 36, a rollcase in the preferred embodiment, which accurately positions tie 8 in a zero reference position along a datum defined by a reference gate 38. The end of the tie 8 abutting the reference gate 38 will hereafter be referred to as the head end of the tie, while the opposite end of the tie 8 will be referred to as the tail end of the tie.

After the tie 8 is brought into abutment with reference gate 38, it is held in place by a set of clamps 40 that engage the tie 8 from the bottom. The clamps 40 also serve to center the tie's longitudinal axis 42 (best shown in FIG. 7) along the central axis 44 of the even ending system 36 and the scanning and drilling station 14.

Scanning and drilling station 14 further comprises a mobile scanning/drilling carriage 46 (best illustrated in FIG. 3), preferably initially positioned at the tail end of the tie 8. Once clamps 40 secure tie 8, the carriage 46 moves from the tail end of the tie 8 to the head end. Along the way, a pair of optical sensors 48 mounted on the carriage 46 scans the tie 8, with the resulting data being processed to derive sweep and cant information.

If the scan determines that the tie bend or other deviation is greater than a pre-determined stored value, the tie 8 is automatically rejected from the drilling station 14 through a system such as rollcase 15. Ties 8 may also be rejected if the computer is unable to find matching data and so is unable to locate preliminary drill holes, for example if an incorrect tie 8 is accidentally loaded at the infeed conveyor deck 10.

Figure 7:
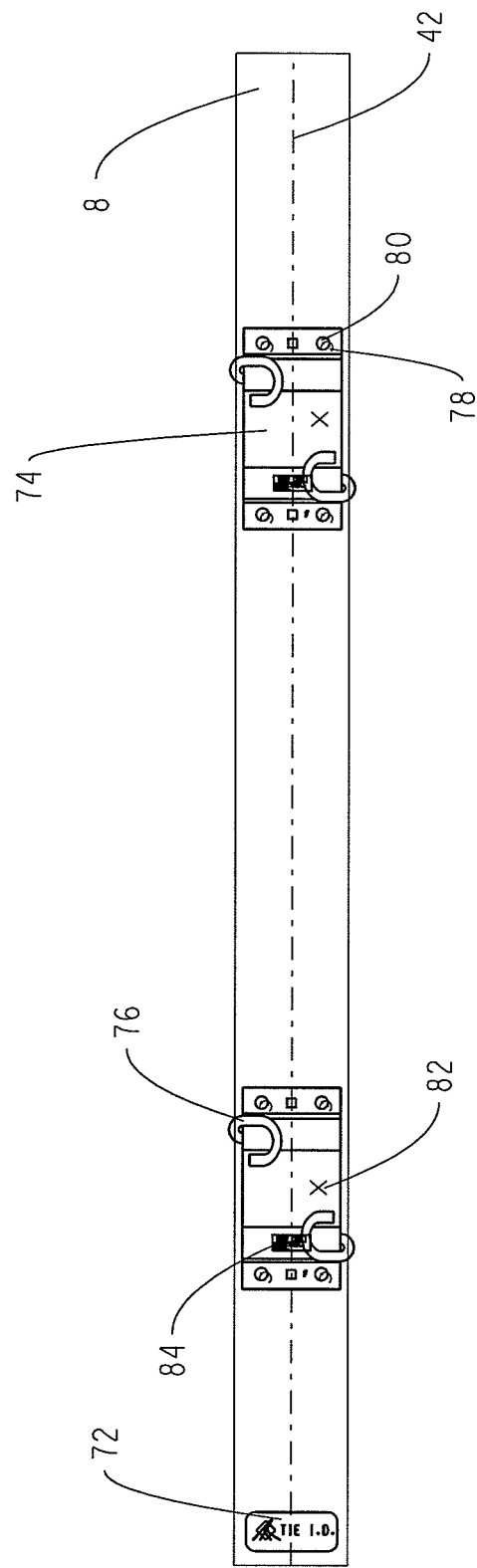
FIG. 7 is a top view of a railway tie with plates and fasteners.

The control system uses the calculated sweep and cant to adjust, if necessary, the instructions stored under each tie's bar code. The control system is therefore capable of actively optimizing the placement of the drill hole locations 78, allowing the drilling station to place the optimized drill holes 80 along a best-fit centerline 42 on the tie drill area for each tie 8, as best shown in FIG. 7.

Referring again to FIG. 3, once the control system has determined the best placement for the optimized drill holes, the carriage 46 moves along the tie 8 from head end to tail end, drilling optimized holes where required. Accurate placement of the drill holes depends on accurate positioning of the drill 50. Preferably, the drill 50 will be adjustable in 3 axes, and will be able to drill holes of approximately ¾" in diameter, to a depth of approximately 6". Drill positioning is therefore controlled, preferably by electric servomotors 52, which drive ball screws 53 in the cross feed and drill feed axes, and a gear reducer and a rack and pinion system in the longitudinal direction. The drill carriage 46 itself may move on ball race slides 54 that are mounted on a rack 56. The depth of the drill holes may be controlled as necessary, for example by a servomotor and sensor or by an air cylinder and fixed rod (not shown).

It is contemplated that a tie 8 will be completely drilled approximately 2 minutes after entering the scanning and drilling station 14. The speed and power of the drill 50 are therefore also important. The drill is preferably a high speed router, but any drill matching the speed and power requirements of the scanning and drilling station may be employed.

Referring again to FIG. 1, after the drilling cycle has been completed, the clamps 40 release and the reference gate 38 is dropped out of the way or otherwise removed, allowing conveyors 24B to carry the drilled tie away. The scanning/drilling carriage 46 simultaneously returns to its initial position. It is to be understood that, while the preferred embodiment includes scanning and drilling in the tail-to-head and head-to-tail directions, respectively, the carriage 46 could be placed at the other end of the station 14, so the scanning and drilling operations are carried out in the opposite directions.

Figure 4:
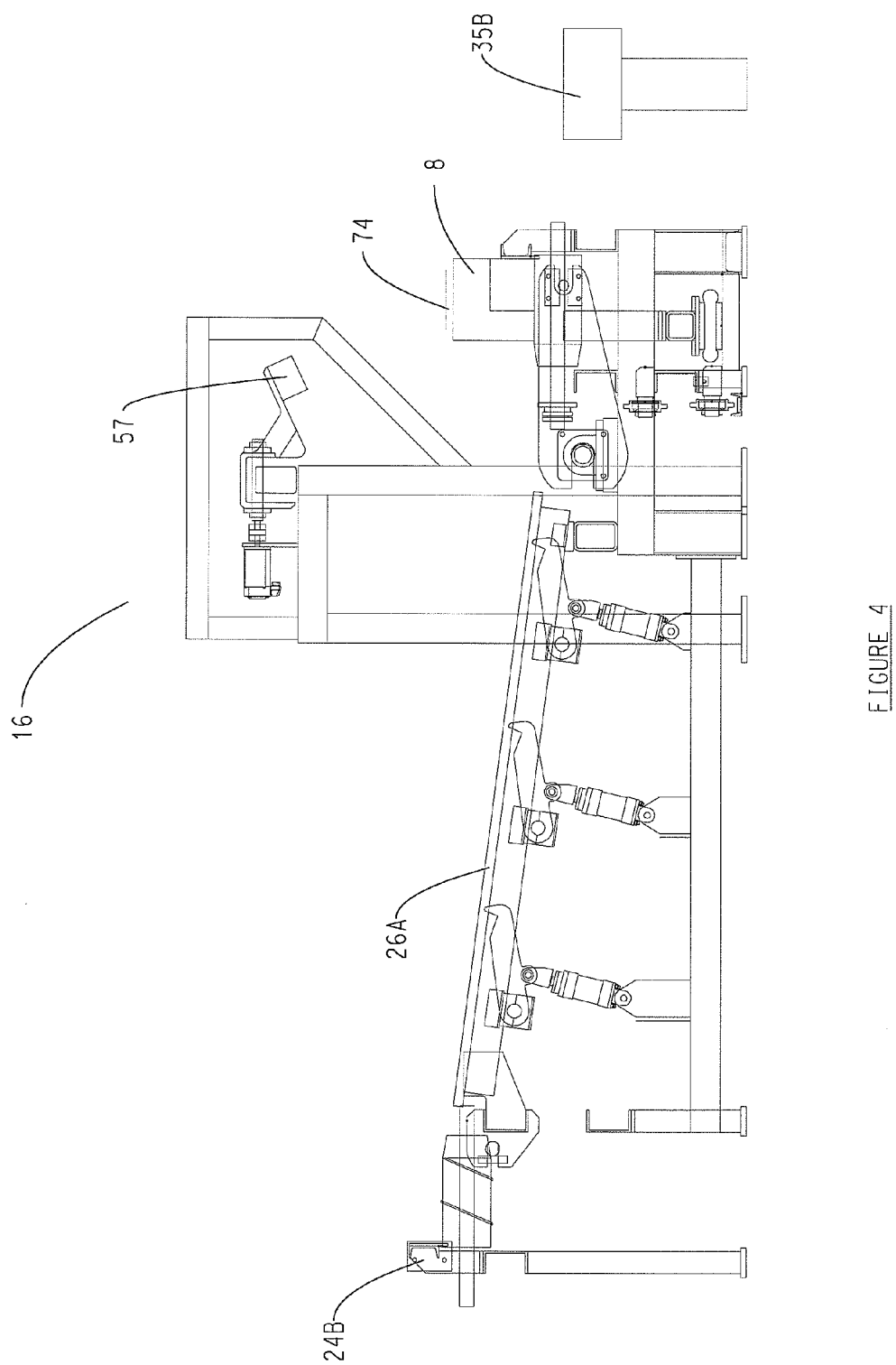
FIG. 4 is an enlarged side view of the plate and fastener loading station, taken along line 4-4 of FIG. 1.

The drilled ties 8 are then conveyed, along conveyors 24B, through buffer zone 26A to the plate and fastener loading station 16, best shown in FIG. 4. An operator at station 16 receives the list of instructions from the control system through console 35B, instructing him as to which plates 74 and fasteners 76 (not shown) should be attached to each tie 8. In the preferred embodiment, the fasteners 76 are screw spikes. Once the plates 74 and screw spikes 76 are manually positioned, the tie 8 is advanced to inspection station 18, as shown in FIG. 1. It is also contemplated that the plate positioning station could be automated, for example, if standard track ties are being processed, rather than switch ties.

The control system sends the list of instructions obtained from the database during the pre-scanning stage to inspection station 18. Inspection station 18 is computer controlled, with identifying indicia, such as bar codes being preferred for rapid and accurate inspection. Preferably, a second overhead scanner 57 inspects each tie 8, verifying by reference to the received list of instructions that the proper plate 74 has been installed and that the plate 74 is in approximately the correct position at the correct orientation. The inspection station 18 indicates whether tie 8 is acceptable or not, for example, by applying some marking 82 to the tie, as best shown in FIG. 7, or with an audible and/or visible signal such as a buzzer, bell and/or light.

The operator at the plate and fastener loading station 16 may preferably be provided with an opportunity to correct the plates or to divert the tie 8 before it proceeds to the tightening station 20. It is contemplated that the overhead scanner 57, which may be a scanner such as a moving barcode reader, may be located at the plate station 16. After all the required plates have been placed on the tie 8, the plate station operator commands a scan. The scanner 57, through position detection and software, determines the position of the identifying indicia 84 (shown in FIG. 7) on each plate 74 and compares it to the data contained in the drawing for that tie 8. The software determines that the correct plates 74 have been placed on the tie 8, and that the plates 74 have been placed at the correct location, within specified limits and in the correct orientation.

The plate station operator receives visual or audible warning, if there are errors. The operator then has the option of making some corrections if possible and then re-scanning. If the errors are beyond the scope of immediate correction the plate station operator may reject that particular tie, sending it to the rejection area 60. In the rejection area 60 the problem can be studied more closely to determine what corrective action is necessary without causing delays to the processing of other ties. If necessary, the plates can easily be removed and a replacement tie may be loaded onto the infeed deck 10.

The use of an inspection station 18 prior to the tightening station 20 avoids the potential waste of ties, screw spikes and plates that can occur when plates are automatically installed and spiked in place. Because the operator is given the opportunity to correct the plates before the plates are permanently spiked in place, there is no need to dispose of or disassemble unsatisfactory plated ties. In addition, no time or energy is wasted on spiking incorrectly plated ties.

Figure 5:
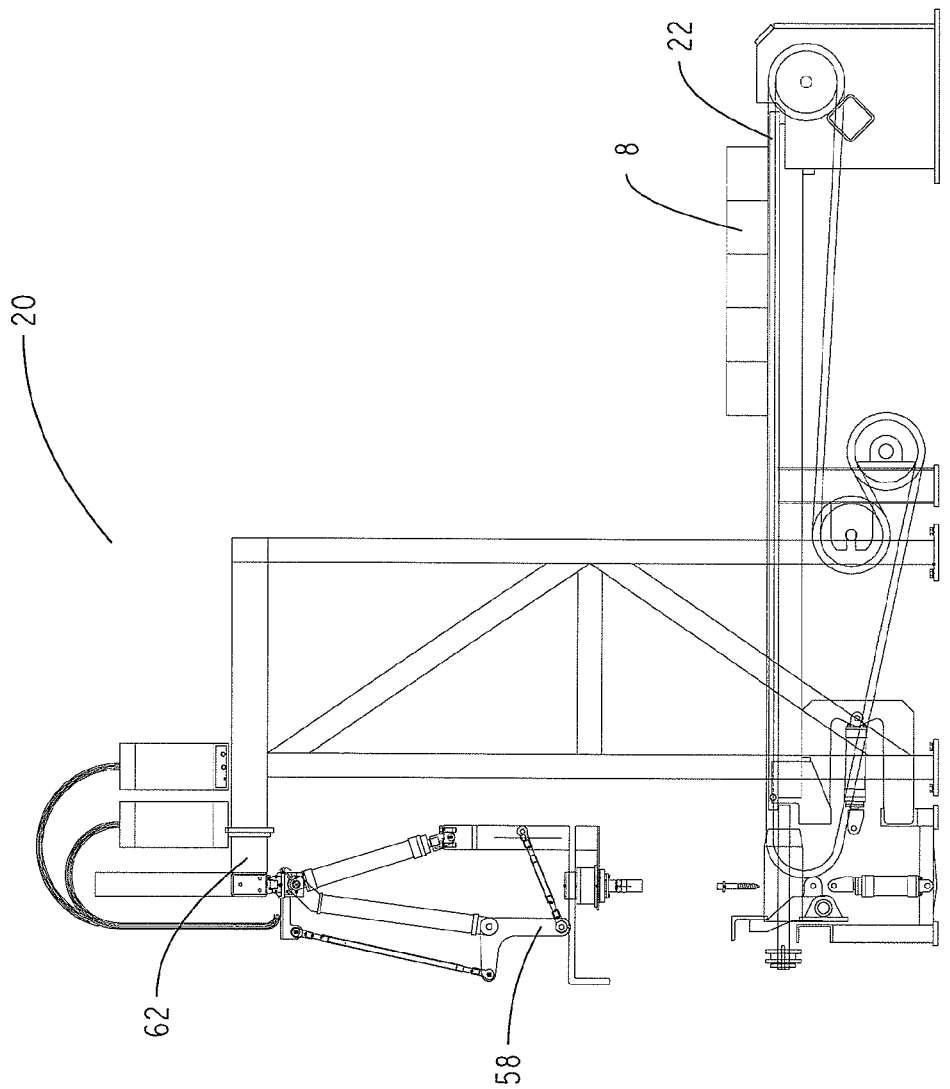
FIG. 5 is an enlarged side view of the tightening station, taken along line 5-5 of FIG. 1.

Once the plates are correctly positioned, the tie 8 moves through buffer zone 26B to the tightening station 20, which is best shown in FIG. 5. Each screw spike is tightened with one of screw spike tighteners 58, preferably comprised of servo motors and drive electronics for torque control driving through planetary gears to a drive socket. The tightening drive support mechanism comprises overhead low friction bearings and overhead track 62 for longitudinal motion, a parallelogram linkage to provide low force cross tie motion and keep the tightening head 58 in the same vertical plane and an air cylinder and controls to provide balancing of the tightening drive. The tie 8 is then advanced from the tightening station 20 to the outfeed conveyor deck 22.

Figure 6:
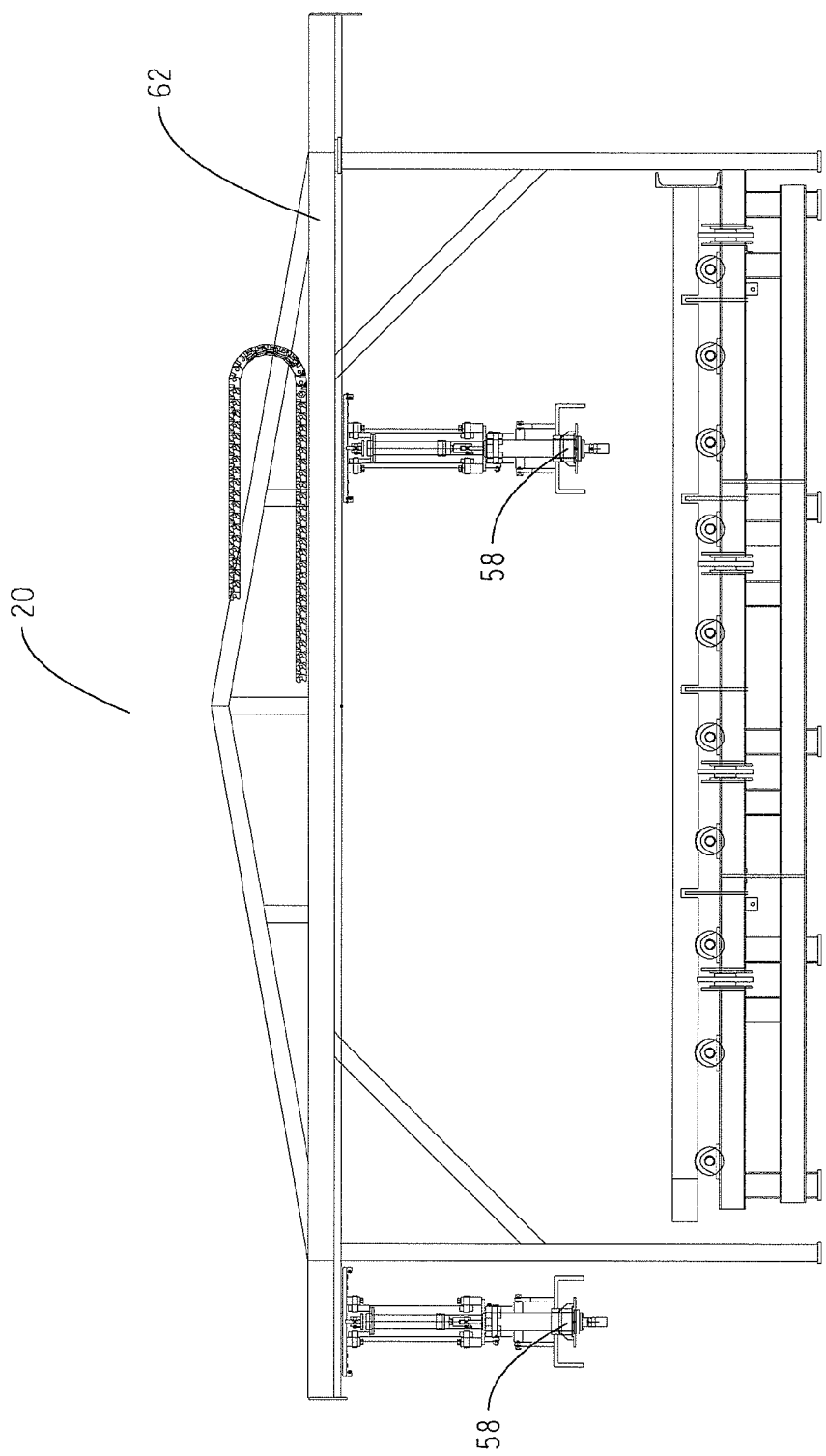
FIG. 6 is an enlarged front view of the tightening station, taken along line 6-6 of FIG. 1.

As best shown in FIG. 6, the preferred embodiment of the invention comprises two tightening heads 58 at the tightening station 20. Preferably, there is enough length on the overhead track 62 such that one of the tightening heads 58 can be moved out of the way if it is not required or not functioning.

In alternate embodiments of the invention, it is also contemplated that a lagging machine, preferably installed overhead on a spike bridge, may instead be used to tighten the fasteners. The tightening station 20 may further include a jib crane or similar apparatus to change the tighteners 58 as required. It is contemplated that this station may further include an automated spike positioning machine, in which case the operator at the plate and fastener loading station 16 would be positioning plates, but not fasteners.

Referring again to FIG. 1, the outfeed conveyor deck 22 feeds the tie 8 to a forklift 64, where it is collected with other ties 8 and removed from the plating line in preparation for storage or shipping. As the tie 8 travels along the outfeed conveyor deck 22 it may be marked with spray paint or other indicia to indicate that it has been inspected and is properly assembled. The assembly line may further include a packing station 66 where the plated ties may be stacked together in bundles 68, following which each bundle 68 may be automatically or manually banded or strapped in preparation for storage or shipping.

Additional safety features may also be incorporated into the assembly line. For example, the outfeed conveyor deck 22 may be controlled in such a way that it only advances when the deck 22 is empty and/or as demanded by the forklift 64 operator. It could also include a safety feature, such as a photocell beam 70, such that the deck 22 advances only when a forklift 64 breaks the beam. It is anticipated that each feed deck 10, 22, conveyor 24 and buffer zone 26 will be computer-controlled, but that there will be manual operator overrides in place, to prevent a particular feed deck 10, 22 or conveyor 24 from operating if there is a problem along the line.

It will be appreciated by those skilled in the art that other variations to the preferred embodiment described herein may be practised without departing from the scope of the invention, such scope being properly defined by the following claims.

What is claimed is:

1. A railway pre-plating apparatus for installing plates on railway ties, comprising:
   an infeed section for conveying singulated railway ties to a pre-drilling inspection station;
   said pre-drilling inspection station configured to identify each tie, said pre-drilling inspection station comprising at least one scanner configured to scan an identifying indicia associated with each tie;
   a computer control system configured to associate drilling and plating instructions stored in a database with each of said identified ties according to said identifying indicia; and
   a drilling and plate fastening section for drilling said ties and installing plates and fasteners on each of said identified ties in response to said drilling and plating instructions received from said computer control system.

2. The railway pre-plating apparatus of claim 1 wherein said drilling and plate fastening section comprises:
   a drilling station for drilling said ties;
   a plate and fastener loading station for installing plates and fasteners on said ties; and
   a tightening station for tightening said fasteners.

3. The railway pre-plating apparatus of claim 2 further comprising an inspection station between said plate and fastener loading station and said tightening station, said inspection station comprising at least one scanner for identifying said plates on said ties and inspecting a position of said plates installed on said ties.

4. The railway pre-plating apparatus of claim 2 wherein said instructions include one or more preliminary locations for drill holes to install said plates and fasteners on said ties.

5. The railway pre-plating apparatus of claim 4 further comprising a secondary scanning section in or before said drilling and plate fastening section wherein further information about said ties are obtained.

6. The railway pre-plating apparatus of claim 5 wherein said further information includes tie sweep and tie cant.

7. The railway pre-plating apparatus of claim 5 wherein said further information is used to adjust said drilling and plating instructions to obtain optimized locations for drill holes.

8. The railway pre-plating apparatus of claim 7 wherein said drilling station drills drill holes at said optimized locations.

9. The railway pre-plating apparatus of claim 2 wherein said database lists one or more tie plates in association with each tie.

10. The railway pre-plating apparatus of claim 9 wherein said list of one or more tie plates associated with each tie is sent to a control console at said plate and fastener loading station.

11. The railway pre-plating apparatus of claim 10 wherein an operator at said plate and fastener loading station receives said list and manually installs said one or more tie plates on each tie, using fasteners.

12. The railway pre-plating apparatus of claim 11 wherein said fasteners are screw spikes.

13. The railway pre-plating apparatus of claim 2 wherein said tightening station further comprises a lagging machine to tighten fasteners installed at said plate and fastener loading station.

14. The railway pre-plating apparatus of claim 13 wherein said lagging machine is mounted above said tightening station, on a spike bridge.

15. The railway pre-plating apparatus of claim 14 further comprising a jib crane to change said lagging machine.

16. The railway pre-plating apparatus of claim 2 further comprising manual override controls, whereby an operator at said pre-drilling inspection station, said plate and fastener loading station, or said tightening station may control said pre-plating apparatus.

17. The railway pre-plating apparatus of claim 1 further comprising an inspection station for identifying said plates on said ties and inspecting a position of said plates installed on said ties by said drilling and plate fastening section.

18. The railway pre-plating apparatus of claim 3 or 17 wherein said inspection station is operative to receive said drilling and plating instructions for each tie from said computer control system and to inspect said ties by reference to said instructions.

19. The railway pre-plating apparatus of claim 18 wherein said inspection station further comprises an alert mechanism if said plates are incorrectly positioned.

20. The railway pre-plating apparatus of claim 1 further comprising an outfeed deck, wherein said outfeed deck further comprises a marking section, where ties are marked to indicate plates have been correctly installed on said ties.

21. The railway pre-plating apparatus of claim 20 wherein said ties are marked with spray paint.

22. The railway pre-plating apparatus of claim 1 further comprising an outfeed deck wherein said outfeed deck terminates at a forklift and further comprises a safety feature to prevent said outfeed deck from operating if said forklift is absent.

23. The railway pre-plating apparatus of claim 22 wherein said safety feature is a photocell beam which prevents said outfeed deck from operating when said beam is uninterrupted.

24. The railway pre-plating apparatus of claim 1 wherein said railway ties are switch ties.

25. The pre-plating apparatus of claim 1 further comprising a packing station, wherein ties are collected into a bundle.

26. The pre-plating apparatus of claim 25 wherein said bundle is strapped, banded or otherwise secured.

27. The railway pre-plating apparatus of claim 1 wherein said drilling and plate fastening section comprises:
   a drilling station for drilling said ties;
   a plate loading station for installing plates on said ties; and
   a fastener installation station for inserting fasteners into said plates and tightening said fasteners.

28. The railway pre-plating apparatus of claim 27 further comprising an inspection station between said plate loading station and said fastener installation station comprising at least one scanner for identifying said plates on said ties and inspecting a position of said plates on said ties.

29. The railway pre-plating apparatus of claim 28 wherein said inspection station is operative to receive said drilling and plating instructions for each tie from said computer control system and to inspect said ties by reference to said instructions.

30. The railway pre-plating apparatus of claim 29 wherein said inspection station further comprises an alert mechanism if said plates are incorrectly positioned.

31. The railway pre-plating apparatus of claim 27 further comprising an inspection station after said fastener installation station comprising at least one scanner for identifying said plates on said ties and inspecting a position of said plates on said ties.

32. The railway pre-plating apparatus of claim 31 wherein said inspection station is operative to receive said drilling and plating instructions for each tie from said computer control system and to inspect said ties by reference to said instructions.

33. The railway pre-plating apparatus of claim 32 wherein said inspection station further comprises an alert mechanism if said plates are incorrectly positioned.

34. The railway pre-plating apparatus of claim 1, further comprising a singulating section before or in said infeed section for singulating said ties.

35. The railway pre-plating apparatus of claim 1 wherein the computer control system associates information with each identified tie, the information including tie length and gauge.

36. The railway pre-plating apparatus of claim 35 wherein said information further includes one or more preliminary locations for installing one or more plates on said ties.

37. The railway pre-plating apparatus of claim 36 wherein said information further includes one or more preliminary locations for drill holes to install one or more plates on said ties.

38. The railway pre-plating apparatus of claim 37 further comprising a secondary scanning section in or before said drilling and plate fastening section wherein further information about said ties are obtained.

39. The railway pre-plating apparatus of claim 38 wherein said further information includes tie sweep and tie cant.

40. The railway pre-plating apparatus of claim 38 wherein said computer control system uses said further information to adjust said preliminary locations for drill holes to obtain optimized locations for drill holes.

41. The railway pre-plating apparatus of claim 40 wherein said drilling and plate fastening section installs drill holes at said optimized locations.

42. The railway pre-plating apparatus of claim 1 wherein said database lists one or more tie plates in association with each tie.

43. The railway pre-plating apparatus of claim 42 wherein said computer control system sends said list of one or more tie plates associated with each tie to said drilling and plate fastening section.

44. The railway pre-plating apparatus of claim 43 wherein an operator at said drilling and plate fastening section receives said list and manually installs said one or more tie plates on each tie, using fasteners.

45. The railway pre-plating apparatus of claim 44 wherein said fasteners are screw spikes.

46. The railway pre-plating apparatus of claim 42 wherein said computer control system sends said list of one or more tie plates associated with each tie to said inspection station.

47. The railway pre-plating apparatus of claim 46 wherein said inspection station conducts a computer-conducted inspection.

48. The railway pre-plating apparatus of claim 47 wherein said computer-conducted inspection further comprises scanning said identifying indicia for each of said ties and compares said list of one or more tie plates to said identifying indicia to ensure said one or more plates are present and are correctly positioned.

49. The railway pre-plating apparatus of claim 48 wherein said inspection station further comprises an alert mechanism if said plates are not present or are incorrectly positioned.

50. The railway pre-plating apparatus of claim 1 further comprising a tightening section, said tightening section comprising a lagging machine to tighten fasteners installed at said drilling and plate fastening section.

51. The railway pre-plating apparatus of claim 50 further comprising manual override controls, whereby an operator at said tightening section may control said pre-plating apparatus.

52. The railway pre-plating apparatus of claim 50 wherein said lagging machine is mounted above said tightening section, on a spike bridge.

53. The railway pre-plating apparatus of claim 52 further comprising a jib crane to change said lagging machine.

54. The railway pre-plating apparatus of claim 1 wherein said database is created by reading railway track layout drawings, calculating information about each tie in said drawing and sending said information to said computer control system.

55. The railway pre-plating apparatus of claim 1 further comprising manual override controls, whereby an operator at said pre-drilling inspection station or said drilling and plate fastening section may control said pre-plating apparatus.

56. The railway pre-plating apparatus of claim 1 wherein:
   said infeed section comprises an infeed conveyor deck and a singulating section for singulating said ties;
   said drill and plate fastening section comprises a drilling station for drilling one or more holes into said ties, a plate and fastener loading station for placing one or more plates and fasteners on each of said ties, an inspection station to verify the placement of said plates and fasteners on said ties, and a tightening station to tighten said fasteners;
   and said pre-plating apparatus further comprises an outfeed conveyor deck.

* * * * *